United States Patent Office 3,140,246
Patented July 7, 1964

3,140,246
PREPARATION OF AROMATIC ACID HALIDES
Russell M. Bimber, Painesville, Ohio, assignor to Diamond Alkali Company, Cleveland, Ohio, a corporation of Delaware
No Drawing. Filed May 11, 1961, Ser. No. 109,256
4 Claims. (Cl. 204—158)

This invention relates to a new and improved process for preparing biologically active materials, and more particularly to a new and improved method for preparing materials used for controlling plant growth.

More specifically, this invention relates to a new and improved procedure for the preparation of compounds of the formula

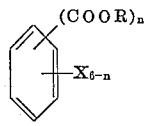

wherein X is halogen, R is selected from the group consisting of alkyl and aralkyl radicals, and $n$ is an integer from 2 to 6, inclusive; and, in particular, for the preparation of dimethyl 2,3,5,6-tetrahaloterephthalate.

Dimethyl 2,3,5,6-tetrachloroterephthalate has proved to be extremely valuable as an herbicide for the control of undesirable grasses, such as crabgrass, as disclosed and claimed in U.S. Patent 2,923,634. This compound has the further advantage of being nontoxic to animals, so that it may be applied to pasture areas without danger of harm to the animals which feed there.

Dimethyl 2,3,5,6-tetrahaloterephthalate has been prepared by halogenating terephthalyl dichloride and reacting the resulting tetrahaloterephthalyl dichloride with methanol. The halogenation step has been carried out by reacting terephthalyl dichloride with halogen in the presence of iron filings, as described by N. Rabjohn in the "Journal of the American Chemical Society," vol. 70, page 3518 (1948). The preparation of tetrahaloterephthalyl dichloride by this method is complicated by the formation of by-products resulting from cleavage of the chlorocarbonyl groups from the ring. For example, chlorination of terephthalyl dichloride results at times in the formation of appreciable quantities of hexachlorobenzene in addition to tetrachloroterephthalyl dichloride. Removal of this hexachlorobenzene has proved to be a very difficult procedure; however, in some instances its presence is undesirable since it is toxic to warm-blooded animals.

An object of the present invention is to provide a new and improved method for the preparation of polyhalopolycarbalkoxybenzenes.

A further object of the invention is to provide a new and improved method for the preparation of substantially pure dimethyl 2,3,5,6-tetrahaloterephthalate.

Still another object of the invention is to prepare dimethyl 2,3,5,6-tetrahaloterephthalate which is essentially free from hexahalobenzene.

These and other objects will become apparent to those skilled in the art upon reading the description of the invention which follows.

The present invention is directed to a process for the preparation of compounds of the formula

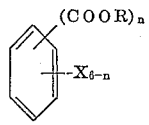

wherein X, R and $n$ are as defined hereinabove, which comprises the steps of halogenating a compound of the formula

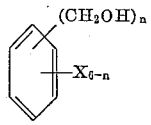

to form a compound of the formula

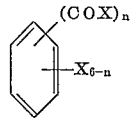

and reacting this compound with a compound of the formula ROM, wherein M is selected from the group consisting of hydrogen and alkali metals.

While the invention is broadly applicable to the preparation of various compounds of this type, the preferred halogen is chlorine and the preferred compounds are derivatives of p-xylene-a,a'-diol and terephthalic acid. For that reason, the specification hereinafter specifically refers to chloroterephthalates and chlorination.

It has been found that cleavage of the side chain in the chlorination of terephthalyl dichloride is catalyzed by the presence of small amounts of iron required for nuclear chlorination. In the present method, no iron is used and, therefore, there is no danger of, or opportunity for, side-chain cleavage.

The chlorination reaction is generally carried out as follows. A solution of 2,3,5,6-tetrachloro-p-xylene-a,a'-diol (which may be prepared, for example, according to the teachings of U.S. Patent 2,631,168), in a suitable solvent, e.g., carbon tetrachloride, perchloroethylene, aliphatic or aromatic hydrocarbons, or the like, is irradiated by means of a suitable light source at a temperature of approximately 25° to 200° C., preferably within the range from 50° to 150° C. A stream of chlorine is passed through the reaction mixture; the molar ratio of chlorine to diol is usually between 4:1 and 10:1, but the exact amount is not critical as long as the molar ratio is at least 4:1.

During the reaction, the insoluble diol is gradually converted to the dichloride and dissolves. When the desired amount of chlorine has been added, the solvent is removed by evaporation, leaving a residue of substantially pure 2,3,5,6-tetrachloroterephthalyl dichloride. The yield is nearly quantitative. If desired, the product may be purified by recrystallization from a suitable solvent; however, even without recrystallization, it is pure enough for most purposes and is entirely free of hexachlorobenzene.

The mechanism of the reaction is not known. However, in view of the conditions under which it takes place, it seems probable that a two-step reaction is involved, comprising an oxidation of the alcohol to an aldehyde by a free radical process followed by a free radical reaction of chlorine with the aldehyde to form the acid chloride. Thus, the apparent reaction may be indicated as follows:

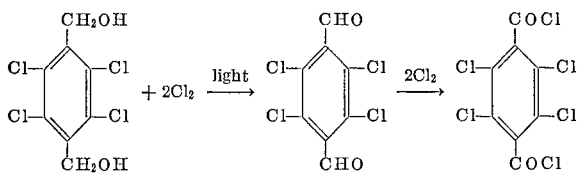

Esterification of the tetrachloroterephthalyl dichloride may be effected by reacting it with an alcohol. However, a preferred method is to introduce the tetrachloroterephthalyl dichloride into the alcohol and to add a solution of an alkali metal alkoxide, typically a solution of about 15 to 25% by weight of the alkoxide in the alcohol. Many of these alkoxides are commercially available; if not, they may be prepared by dissolving the appropriate alkali metal in the alcohol. The esterification can be carried out at atmospheric pressure and at the reflux temperature of the alcohol, or conveniently, at a higher temperature, which can be obtained by refluxing the mixture at a pressure of about 10 p.s.i.g., the pressure preferably being maintained at about 50 p.s.i.g. When sufficient pressure is employed to maintain the esterification reaction temperature about 25–35° higher than the boiling point of the alcohol at atmospheric pressure, esterification usually can be carried out in about 2 hours or less. Generally, it is preferred to regulate the pressure and temperature so as to effect esterification over a somewhat longer time of about 5 to 7 hours, although there will be instances where an extremely short reaction time would be desired, e.g., as in a continuous operation. In such cases the use of superatmospheric pressure and the resulting higher temperature are recommended.

Alternatively, esterification may be carried out by introducing the tetrachloroterephthalyl dichloride into the alcohol to which is added an alcoholic solution of an alkali metal hydroxide, preferably sodium hydroxide, which, of course, involves generating the desired sodium alkoxide in situ. In such event, it generally is desirable to use a substantially saturated solution, i.e., alcohol partially or substantially saturated with sodium hydroxide. Satisfactory results are obtained using 25% by weight sodium hydroxide dissolved in the alcohol.

The following examples are given in order that those skilled in the art may more completely understand the invention and the preferred means by which the same may be brought into effect.

EXAMPLE I

2,3,5,6-Tetrachloroterephthalyl Dichloride

Ten grams of 2,3,5,6-tetrachloro-p-xylene-a-a'-diol is suspended in 200 ml. of carbon tetrachloride at 68° to 73° C. and irradiated with ultraviolet light from a Hanovia lamp in a quartz immersion well while 78 g. of chlorine is passed through. The suspended material goes into solution during the chlorination and no solid separates on cooling to room temperature. The solution is then evaporated to near dryness, and the residue is washed with carbon tetrachloride. There is obtained 10.3 g. of white powder, melting point 145°–147° C. This material is shown by vapor phase chromatographic analysis to be 2,3,5,6 - tetrachloroterephthalyl dichloride, containing about 1–2% pentachlorobenzoyl chloride. The yield is 83.5% of the theoretical amount. There is no evidence of the presence of hexachlorobenzene in the product.

Evaporation of the filtrate yields 3.5 g. of a yellowish solid, melting point 128°–139° C. This material is evidently impure tetrachloroterephthalyl dichloride, since the starting material (2,3,5,6-tetrachloro-p-xylene-a-a'-diol) melts at 230°–231° C.

EXAMPLE II

Dimethyl 2,3,5,6-Tetrachloroterephthalate

PART A

The crude tetrachloroterephthalyl dichloride produced according to the procedure of Example I is charged in an amount of 50 lbs. into 13 gals. of methanol containing 26.7 liters of 25% sodium methoxide solution in methanol. Esterification is carried out for 8½ hours at a temperature of 65° C. to obtain 41.5 lbs. of crude dimethyl 2,3,5,6-tetrachloroterephthalate, comprising 95.2% crude yield based on the tetrachloroterephthalyl dichloride. Infrared analysis indicates a product purity of 87.5%. The crude product melts at 148° to 153° C.

PART B

In order to illustrate the purification of dimethyl 2,3,5,6-tetrachloroterephthalate, 300 g. of crude dimethyl 2,3,5,6-tetrachloroterephthalate obtained by the method outlined in Part A of this example, is recrystallized (using 2–3% decolorizing carbon and 5% diatomaceous earth as a filter aid) from 500 ml. of carbon tetrachloride. There is obtained 80% of pure dimethyl 2,3,5,6-tetrachloroterephthalate, melting at 158.5°–160° C. Similar advantageous results are obtained using as a solvent toluene or a crude xylol. If desired, the solvent can be recycled several times, e.g., up to about 4 times.

It is to be understood that, although the invention has been described with specific reference to particular embodiments thereof, it is not to be so limited, since changes and alterations therein may be made which are within the full intended scope of the invention as described by the appended claims.

What is claimed is:

1. A process for the preparation of 2,3,5,6-tetrachloroterephthalyl dichloride which comprises photochemically chlorinating 2,3,5,6-tetrachloro-p-xylene-a-a'-diol at a temperature within the range of about 50° to about 150° C.

2. A process for the preparation of 2,3,5,6-tetrachloroterephthalyl dichloride which comprises reacting chlorine at a temperature within the range of about 50° to about 150° C. with 2,3,5,6-tetrachloro-p-xylene-a-a'-diol in a molar ratio of between 4:1 and 10:1, respectively in the presence of ultraviolet light.

3. The method of preparing a compound of the formula:

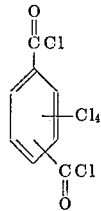

which comprises reacting 4 to 10 mols of chlorine per mol of a compound of the formula

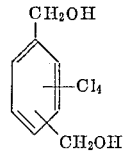

in the presence of ultraviolet light at a temperature within the range of about 50° to about 150° C.

4. A process for preparing a compound of the formula

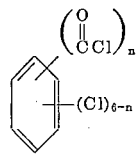

wherein $n$ is an integer from 2 to 6, inclusive, which comprises reacting at least 4 moles of chlorine with each mole of a compound of the formula

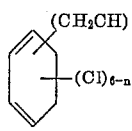

under the influence of ultraviolet light at a temperature within the range of about 50° to about 150° C.

References Cited in the file of this patent
UNITED STATES PATENTS

| | | |
|---|---|---|
| 1,851,832 | Henderson et al. | Mar. 29, 1932 |
| 2,525,722 | Rabjohn | Oct. 10, 1950 |
| 2,631,168 | Ross et al. | Mar. 10, 1953 |
| 2,676,187 | Foster et al. | Apr. 20, 1954 |
| 3,052,712 | Zinn et al. | Sept. 4, 1962 |

OTHER REFERENCES

Rabjohn: J. Am. Chem. Soc., vol. 70, page 3518, 1948 (QD 1–A5).

Noller: Chemistry of Organic Compounds (Philadelphia, 1957), pages 547–49.

UNITED STATES PATENT OFFICE
CERTIFICATE OF CORRECTION

Patent No. 3,140,246                            July 7, 1964

Russell M. Bimber

It is hereby certified that error appears in the above numbered patent requiring correction and that the said Letters Patent should read as corrected below.

Column 5, lines 5 to 10, the structural formula should appear as shown below instead of as in the patent:

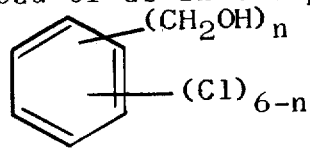

Signed and sealed this 10th day of November 1964.

(SEAL)
Attest:

ERNEST W. SWIDER                          EDWARD J. BRENNER
Attesting Officer                             Commissioner of Patents